United States Patent [19]
Smith

[11] 4,236,790
[45] Dec. 2, 1980

[54] TEMPERATURE COMPENSATED POSITIONING DEVICE

[75] Inventor: Ronald D. Smith, Oriskany, N.Y.

[73] Assignee: General Electric Company, Utica, New York

[21] Appl. No.: 905,822

[22] Filed: May 15, 1978

[51] Int. Cl.[3] .................................................. G02B 7/02
[52] U.S. Cl. ...................................................... 350/253
[58] Field of Search ................. 350/253; 333/234, 229

[56] References Cited

U.S. PATENT DOCUMENTS 2,533,478 12/1950 Lee et al. ............................ 350/253
2,575,020 11/1951 Lee et al. ............................ 350/253
2,790,151 4/1957 Riblet .................................. 333/229

*Primary Examiner*—John K. Corbin
*Assistant Examiner*—Wm. H. Punter
*Attorney, Agent, or Firm*—Ralph M. Savage

[57] ABSTRACT

The temperature compensated positioning device consists of a stationary member, a movable member, a compensating material, and support material between each member. Each member is attached to two surfaces which must be held in a precise dimensional relationship with respect to each other automatically over a wide temperature range.

6 Claims, 3 Drawing Figures

4

8

6

2

TEMPERATURE COMPENSATED POSITIONING DEVICE

BACKGROUND OF THE INVENTION

1. Field of the Invention

The invention relates to apparatus for maintaining a desired dimensional relationship between two surfaces when that apparatus is exposed to an environment consisting of wide variations in temperature.

2. Description of Prior Art

The ability to achieve and maintain a desired dimensional relationship between two surfaces has previously been achieved by electro-mechanical means, by thermal stabilization, and by temperature compensating structures.

The electro-mechanical methods require the use of temperature sensing devices, associated sensing and drive circuits and motors to move the position of one surface as a temperature change is sensed. The drawbacks involved with these methods are the cost, complexity, size, and weight penalties imposed by the motors, control circuitry, and associated structural mounts involved.

The thermal stabilization methods require that provisions such as thermal blankets and heaters be incorporated to essentially maintain an isothermal environment. In most cases where even a minimal temperature range is to be encountered, the power required and other problems with maintaining the ability to operate at high temperatures (limiting allowable insulation) make this approach infeasible.

The use of temperature compensating structures has permitted a limited amount of temperature compensation movement to be achieved in specific designs by varying the structural materials used in the housing containing the surfaces desired to be separated. Strength requirements of the housing structure involved normally limit the material selection to a narrow range of strong materials (e.g., stainless steel, invar, or aluminum) and each application must be highly individualized. In addition to the cost involved in each specialized housing design, the limited range of temperature related movement achievable normally results in less than optimum results.

Accordingly, it is an object of the present invention to provide a temperature compensating positioning device that has a combination of characteristics which will enable it to overcome the aforementioned disadvantages of the prior art devices and which make it particularly well suited to the requirements of avionic equipment. Such avionic equipment requirements which this novel invention can meet include small size, and weight, operability over a wide temperature range, and high reliability.

SUMMARY OF THE INVENTION

The foregoing objects are achieved according to this invention through the utilization of a movable member positioned within a stationary member in a slip fit fashion. A temperature compensating material is placed along the axial length of the members and is firmly affixed at its axial extremeties to a protruding lip of each of the members.

A supporting means is located between each of the members so that the movable member, can be approximately centered and supported within the stationary member. Such supporting means also facilitate the axial movement of the movable member as the compensating material expands or contracts as the temperature increases or decreases.

BRIEF DESCRIPTION OF THE DRAWINGS

Various other objects, features and attendant advantages of the present invention will be more fully appreciated from the following detailed description in connection with the accompanying drawings.

DESCRIPTION OF THE PREFERRED EMBODIMENT

Figure 1:
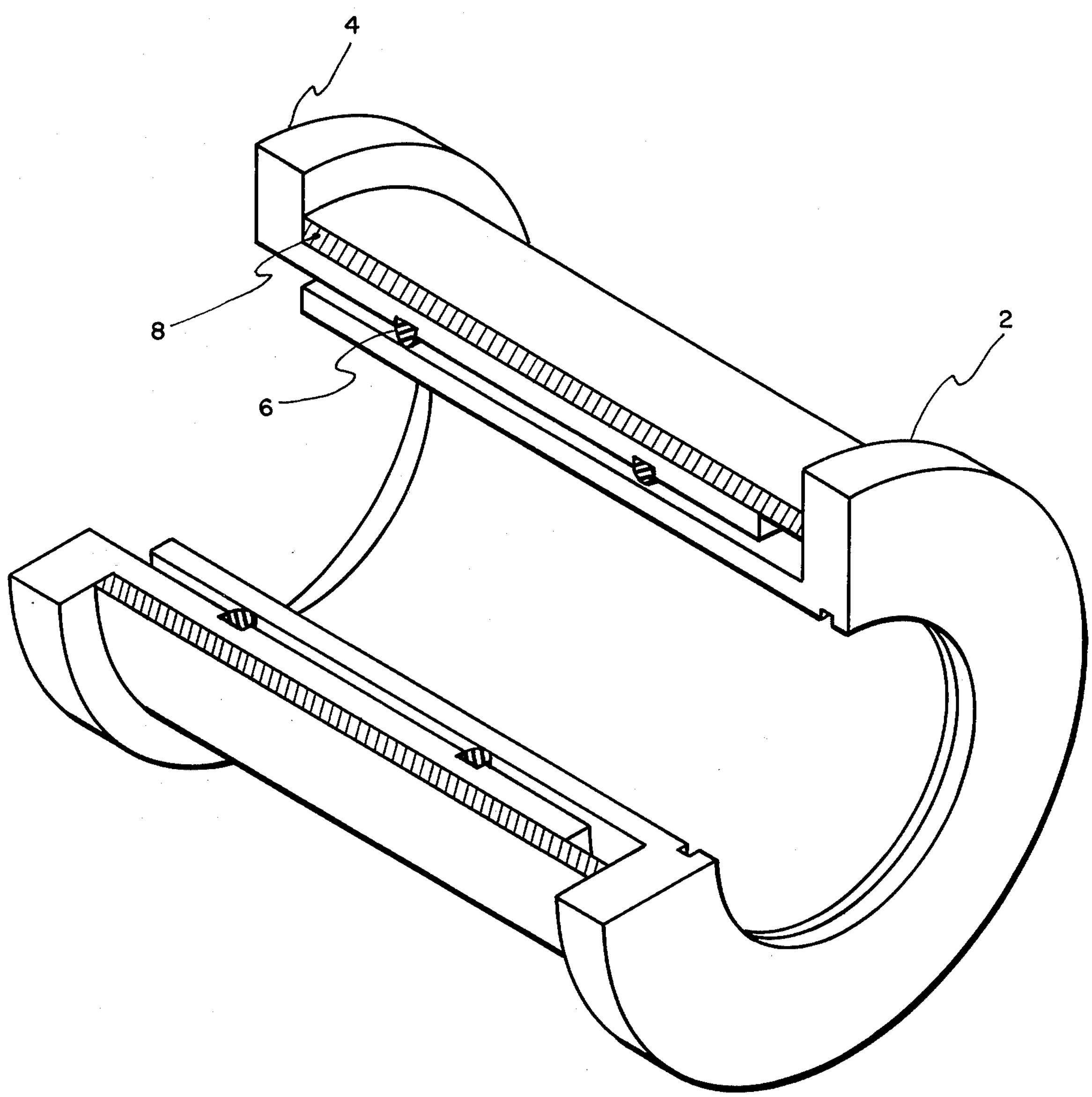
FIG. 1 is a cutaway perspective view of an embodiment of a temperature compensating positioning device according to the invention.

A cutaway perspective view of the temperature compensating positioning device is shown in FIG. 1. Movable member 2 has a major portion of its axial length contained within the axial length of stationary member 4. Movable member 2 and stationary member 4 are securely attached to the two surfaces respectively, whose dimensional relationship is to be controlled over temperature. The members are assembled together in a slip fit fashion with a support means 6, such as O rings, used to provide radial support and axial centering. It should be mentioned that while the cross section of members 2 and 4 and material 8 are shown to be circular in FIG. 1, their cross section could be of any geometrical shape. The invention is not intended to be limited to circular cross sections for those elements.

The axial ends of temperature compensating material 8 are firmly attached to the protruding lips of each movable and stationary member. In this manner the compensating material 8 establishes the predetermined axial dimensional relationship at room temperature between the two surfaces to be controlled.

As the temperature environment changes the axial length dimension of compensating material 8 will change as a function of its length and coefficient of thermal expansion. The change in the length dimension can be predetermined by the following relationship:

$$1c = a''1 \qquad (1)$$

where,

1c = temperature induced movement (inches/° C.)

a'' = coefficient of thermal expansion (inches/inch/° C.)

1 = length of compensator material (inches)

Therefore, by changing the nominal length and the composition of the material used for compensating material 8, a wide range of predictable dimensional change characteristics over a temperature range can be achieved with this same basic device.

The instant invention has been conceived so that the compensating material 8 is not required to carry any structural loads. This is accomplished by locating the compensating material contiguous to the axial length of stationary member 4. Such a structure allows the designer great latitude in the selection of a wide range of materials that would be suitable e.g., metals and plastics. In the event that a desired material does not have sufficient strength characteristics to allow the end attachment of its ends to the movable member, a device such as a spring could be used to apply an axial force to the movable member to insure that both members remain in close contact with the compensating material.

Figure 2:
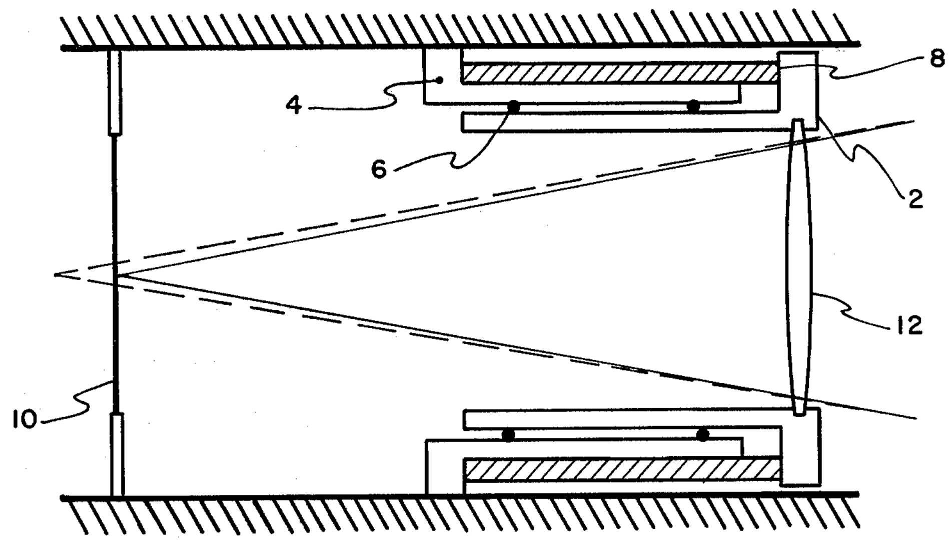
FIG. 2 illustrates the application of the present invention in an imaging system.

The invention may be more fully appreciated with the delineation of its operation in a practical application. One such application is illustrated in FIG. 2 where the instant invention is utilized in an imaging system. In such a system, the instant invention can provide a simple, inexpensive, lightweight, ând compact method of maintaining focus of a lens on a fixed image plane throughout a wide temperature range.

In the configuration shown in FIG. 2 stationary member 4 is securely fastened to a first surface, in this case an imaging plane surface 10. The movable member is securely fastened to a second surface, in this case optical lens surface 12. At the normal operating temperature of the system (e.g., room temperature) the desired image will be in focus at imaging plane surface 10. Changes in temperature will affect the optical equipment situated to the right of lens surface 12 in FIG. 2 in such a fashion as to cause the focal length of the lens located at lens surface 12 to change (as shown by the dashed lines). This will create an out of focus condition at imaging plane surface 10. For a particular lens system one can predetermine the amount of change in the focal length for an anticipated change in temperature.

For example, it may be determined that the distance between lens surface 12 and imaging plane surface 10 will vary by 0.00052 inches per degree centrigrade from a specified nominal room temperature value over an anticipated temperature exposure range. The length of a suitable compensating material can be determined by using the relationship expressed in equation 1.

By selecting a variety of coefficients of thermal expansion from a text such as Marks' Mechanical Engineer's Handbook, McGraw Hill Publishing Company, one can determine what type of compensating material to utilize. For this example, a high density polyethylene with a coefficient of thermal expansion of 0.000198 inches/inch/° C. is found to be very practical because a length ($1=1c/a''=0.00052/0.000198=2.626$ inches) of only 2.626 inches would be sufficient.

Figure 3:
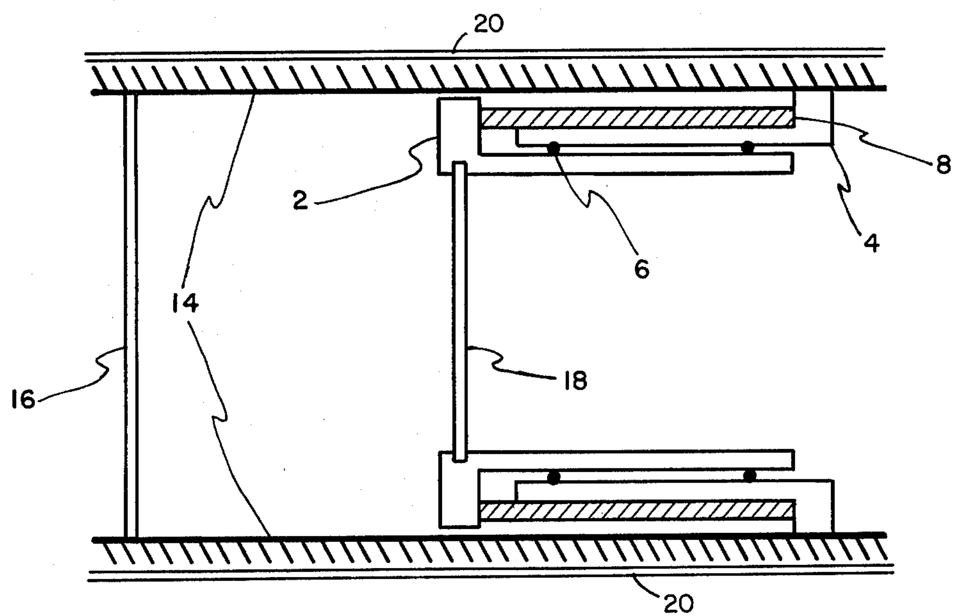
FIG. 3 illustrates the application of the present invention in a system where it is desired to maintain the distance between two points the same in a changing temperature environment.

FIG. 3 represents the application of the instant invention in a system in which it is desired to maintain two objects a fixed distance apart. Object 16 is securely fastened by way of housing 14 to stationary member 4. The second object, object 18 is securely fastened to movable member 2. The distance between objects 16 and 18 will vary as the temperature changes because the structural members between them, primarily housing 14, will expand and contract as the temperature increases or decreases. Once the anticipated temperature range has been determined and knowing the composition and length of housing 14 between object 16 and stationary member 4, equation 1 can be used to calculate the amount of temperature induced movement one can expect between objects 16 and 18. Equation 1 can then be used again to calculate the length of a suitable compensating material which can conteract any expansion or contraction of housing 14 so that objects 16 and 18 can be maintained at an equal distance over the operational range of temperatures.

The instant invention can also be utilized in a system where it is desired to change the distance between two surfaces or objects in a predetermined manner. By using equation 1 and knowing the distances that it is desired to move the two objects, one can determine the composition of the compensating material which should be used. Merely by changing the temperature of the compensating material by a thermal blanket or any type of heating or cooling device the distance between the two objects can then be varied in a predetermined manner a thermal blanket 20 is shown in FIG. 3, although its exact location relative to the compensating material is not critical.

While a preferred embodiment of the invention has been shown and described, various other embodiments and modifications thereof will become apparent to persons skilled in the art, and will fall within the scope of inventions as defined in the following claims.

I claim:

1. A temperature compensated positioning device for automatically maintaining a first surface and a second surface in a precise dimensional relationship with respect to one another over a desired temperature range which comprises:

a stationary member attached to said first surface;

a movable member attached to said second surface, said movable member being partially positioned within said stationary member to have freedom of axial movement;

a temperature compensating non-metallic material contiguous to the axial length of said stationary member affixed at one end to said stationary member and affixed at its opposite end to said movable member, said temperature compensating material changing in dimensions as a function of temperature whereby the changes in dimensions cause axial movement of said movable member with respect to said stationary member; and support means comprising at least one "O" ring positioned between said stationary member and said movable member to provide radial centering and support so that said compensating material is not required to carry any structural loads.

2. The temperature compensated positioning device as defined in claim 1, in which the movable member has a cylindrical shape along its axial length and has a lip on one of its ends, said lip being a radial projection wide enough to provide a surface for said compensating material to become affixed to.

3. The temperature compensated positioning device as defined in claim 1, in which the stationary member has a cylindrical shape along its axial length and has a lip on one of its ends, said lip being a radial projection wide enough to provide a surface for said compensating material to become affixed to.

4. A temperature compensated positioning device for automatically adjusting the distance between a first surface and a second surface in a predetermined manner which comprises:

a stationary member attached to said first surface;

a movable member attached to said second surface, said movable member being partially positioned within said stationary member to have freedom of axial movement;

a temperature compensating non-metallic material contiguous to the axial length of said stationary member affixed at one end to said stationary member and affixed at its opposite end to said movable member, said temperature compensating material changing in dimensions as a function of temperature whereby the changes in dimension cause axial movement of said movable member with respect to said stationary member;

support means comprising at least one "O" ring positioned between said stationary member and said movable member to provide radial centering and support so that said compensating material is not required to carry any structural loads; and a temperature changing means to increase or decrease the temperature of said compensating material.

5. The temperature compensated positioning device as defined in claim 4, in which the movable member has a cylindrical shape along its axial length and has a lip on one of its ends, said lip being a radial projection wide enough to provide a surface for said compensating material to become affixed to.

6. The temperature compensated positioning device as defined in claim 4, in which the stationary member has a cylindrical shape along its axial length and has a lip on one of its ends, said lip being a radial projection wide enough to provide a surface for said compensating material to become affixed to.

* * * * *